(12) United States Patent
Narayanan

(10) Patent No.: US 11,556,986 B2
(45) Date of Patent: Jan. 17, 2023

(54) INFORMATION LINKAGE PLATFORM FOR ENHANCED TRACKING OF PROCESSED EVENTS

(71) Applicant: Bank of America Corporation, Charlotte, NC (US)

(72) Inventor: Manoj Narayanan, East Windsor, NJ (US)

(73) Assignee: Bank of America Corporation, Charlotte, NC (US)

( * ) Notice: Subject to any disclaimer, the term of this patent is extended or adjusted under 35 U.S.C. 154(b) by 126 days.

(21) Appl. No.: 17/068,982

(22) Filed: Oct. 13, 2020

(65) Prior Publication Data

US 2022/0114665 A1 Apr. 14, 2022

(51) Int. Cl.
*G06Q 40/04* (2012.01)
*G06Q 30/00* (2012.01)
*G06F 3/14* (2006.01)
*G06Q 40/00* (2012.01)

(52) U.S. Cl.
CPC ......... *G06Q 40/04* (2013.01); *G06Q 30/0185* (2013.01); *G06Q 40/12* (2013.12); *G06F 3/14* (2013.01)

(58) Field of Classification Search
CPC .... G06Q 40/04; G06Q 40/12; G06Q 30/0185; G06F 3/14
See application file for complete search history.

(56) References Cited

U.S. PATENT DOCUMENTS

| | | | |
|---|---|---|---|
| 6,628,583 B1 | 9/2003 | Van Den Enden et al. | |
| 6,868,415 B2 | 3/2005 | Kageyama et al. | |
| 7,437,301 B2 | 10/2008 | Kageyama et al. | |
| 7,590,581 B1 | 9/2009 | Payne et al. | |
| 7,617,143 B2 | 11/2009 | Fornasari | |
| 7,769,657 B2 | 8/2010 | Chacko et al. | |
| 7,895,101 B1 | 2/2011 | Ferguson et al. | |
| 7,979,382 B2 | 7/2011 | Guyan et al. | |
| 7,987,132 B2 | 7/2011 | Payne et al. | |
| 8,185,466 B2 * | 5/2012 | Martinez ................ | G06Q 40/00 705/37 |

(Continued)

*Primary Examiner* — Florian M Zeender
*Assistant Examiner* — Christopher R Buchanan
(74) *Attorney, Agent, or Firm* — Banner & Witcoff, Ltd.

(57) ABSTRACT

Aspects of the disclosure relate to enhanced tracking of processed events. A computing platform may receive event processing identifiers corresponding to a particular event. Using the event processing identifiers, the computing platform may generate event linkage information corresponding to the particular event, and may store the event processing identifiers along with the event linkage information. The computing platform may receive a request to access event lifecycle information corresponding to the particular event. Using the event linkage information, the computing platform may identify a plurality of event processing systems performed actions associated with the particular event. The computing platform may request and receive, from each of the plurality of event processing systems, system-specific event lifecycle information corresponding to the particular event. The computing platform may send an event lifecycle interface and one or more commands directing an administrator computing device to display the event lifecycle interface.

20 Claims, 11 Drawing Sheets

(56) References Cited

U.S. PATENT DOCUMENTS

| | | |
|---|---|---|
| 8,224,859 B2 | 7/2012 | Guyan et al. |
| 8,265,965 B2 | 9/2012 | Co et al. |
| 8,266,026 B2 | 9/2012 | Co et al. |
| 8,374,941 B2 | 2/2013 | Payne et al. |
| 8,423,446 B2 | 4/2013 | Co et al. |
| 8,615,460 B1 | 12/2013 | Payne et al. |
| 10,223,107 B2 | 3/2019 | Liimatainen |
| 10,424,005 B2 * | 9/2019 | Corlett ............... G06Q 30/0635 |
| 2009/0240564 A1 * | 9/2009 | Boerries ................ G06Q 30/02 709/204 |
| 2015/0178703 A1 * | 6/2015 | Lawrence .............. G06Q 20/20 705/16 |
| 2016/0103678 A1 * | 4/2016 | Akbulut ................... G06F 8/70 717/120 |
| 2017/0039644 A1 * | 2/2017 | Palmer .................. G06Q 40/04 |
| 2017/0039662 A1 | 2/2017 | McKenna et al. |
| 2017/0076376 A1 | 3/2017 | Baysal et al. |
| 2017/0124617 A1 * | 5/2017 | Spoelstra ............. G06F 16/958 |
| 2019/0236312 A1 * | 8/2019 | Peuhkurinen ....... G06F 21/6281 |
| 2020/0226686 A1 | 7/2020 | McDermott |

* cited by examiner

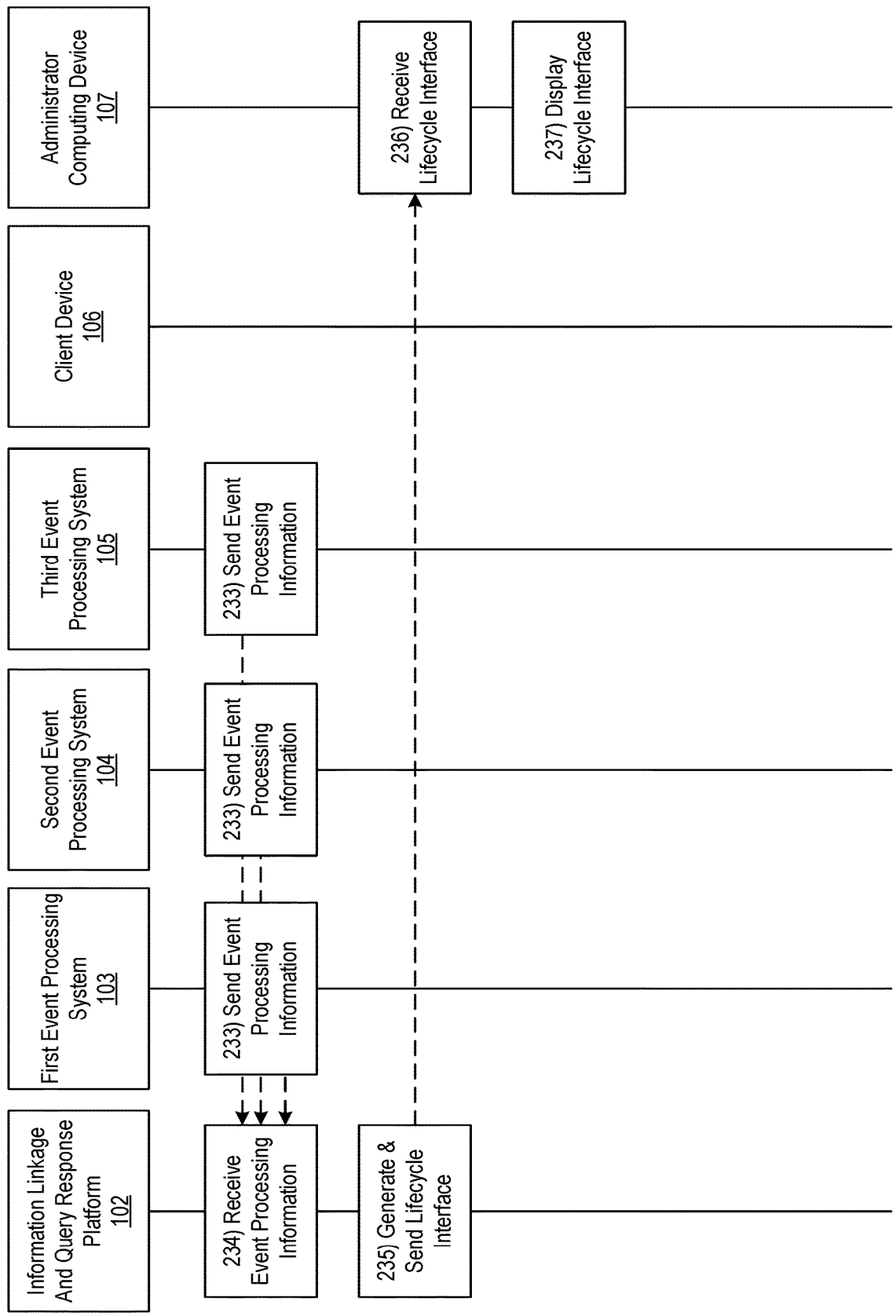

305

Lifecycle Interface

The following systems were involved in the requested trade:

Order Management System

Execution System

Allocation System

For more information, select any of the above noted systems.

FIG. 3

INFORMATION LINKAGE PLATFORM FOR ENHANCED TRACKING OF PROCESSED EVENTS

BACKGROUND

Aspects of the disclosure relate to management and review of event processing. In particular, one or more aspects of the disclosure relate to computing platforms that provide enhanced tracking throughout an event processing lifecycle.

In some cases, enterprise organizations may use different systems to manage each stage of an event processing lifecycle. For example, each of the different systems may be responsible for performing a unique task or set of tasks that, once completed by each system, may result in processing of a particular event. In some instances, however, information and/or identifiers provided by these different systems might not be linked together. Accordingly, enterprise organizations and/or other individuals may experience difficulties trying to access event lifecycle information, across the different systems, corresponding to a previously processed event.

SUMMARY

Aspects of the disclosure provide effective, efficient, scalable, and convenient technical solutions that address and overcome the technical problems associated with tracking of processed events. In accordance with one or more embodiments of the disclosure, a computing platform comprising at least one processor, a communication interface, and memory storing computer-readable instructions may receive, from a plurality of event processing systems, event processing identifiers corresponding to a particular event. Using the event processing identifiers corresponding to the particular event, the computing platform may generate event linkage information corresponding to the particular event. The computing platform may store the event processing identifiers corresponding to the particular event along with the event linkage information corresponding to the particular event. The computing platform may receive a request to access event lifecycle information corresponding to the particular event. Using the event linkage information corresponding to the particular event, the computing platform may identify that the plurality of event processing systems performed actions associated with the particular event. The computing platform may request, from each of the plurality of event processing systems, system-specific event lifecycle information corresponding to the particular event. The computing platform may receive, from each of the plurality of event processing systems, the system-specific event lifecycle information corresponding to the particular event. Using the system-specific event lifecycle information corresponding to the particular event, the computing platform may generate an event lifecycle interface and one or more commands directing an administrator computing device to display the event lifecycle interface. The computing platform may send, to the administrator computing device, the event lifecycle interface and the one or more commands directing the administrator computing device to display the event lifecycle interface.

In one or more instances, the plurality of event processing systems may include a first event processing system, a second event processing system, and a third event processing system. In these instances, the system-specific event lifecycle information corresponding to the particular event may include first event lifecycle information from the first event processing system, second event lifecycle information from the second event processing system, and third event lifecycle information from the third event processing system. Additionally, in these instances, the first event lifecycle information, the second event lifecycle information, and the third lifecycle information may be unique from each other.

In one or more instances, the event processing identifiers may include a first event processing identifier corresponding to the first event processing system, a second event processing identifier corresponding to the second event processing system, and a third event processing identifier corresponding to the third event processing system. In one or more instances, the first event processing identifier may be sent, from the first event processing system, to the computing platform and the second event processing system. In these instances, the second event processing identifier may be sent, from the second event processing system, to the computing platform and the third event processing system. Additionally, in these instances, the third event processing identifier may be sent, from the third event processing system, to the computing platform.

In one or more instances, the second event processing identifier may be received from the second event processing system along with the first event processing identifier, and the third event processing identifier may be received from the third event processing system along with the second event processing identifier.

In one or more instances, the actions associated with the particular event include first actions performed by the first event processing system, second actions performed by the second event processing system, and third actions performed by the third event processing system. In these instances, the first event processing system may complete the first actions before the second event processing system initiates the second actions, and the second event processing system may complete the second actions before the third event processing system initiates the third actions.

In one or more instances, the plurality of event processing systems may include one or more of: an order management system, an execution system, or an allocation system. In one or more instances, the particular event may be a stock trade or a transaction in one or more non-stock securities. In one or more instances, the event lifecycle information corresponding to the particular event may indicate actions performed by each of the plurality of event processing systems to complete the stock trade or the transaction in the one or more non-stock securities.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for implementing information linkage for enhanced tracking of processed events in accordance with one or more example embodiments;

FIG. 3 depicts an illustrative graphical user interface for implementing information linkage for enhanced tracking of processed events in accordance with one or more example embodiments.

DETAILED DESCRIPTION

Figure 1A:
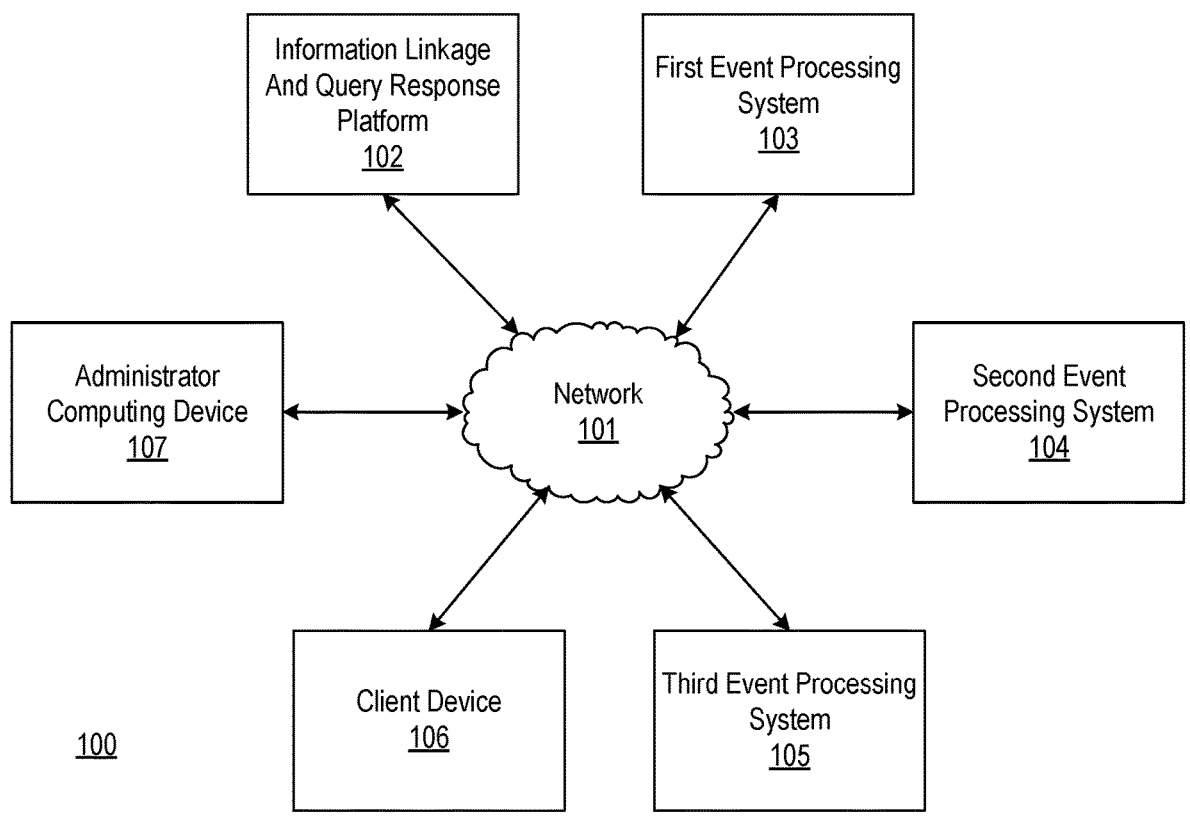
FIGS. 1A-1B depict an illustrative computing environment for implementing information linkage for enhanced tracking of processed events in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe a non-intrusive method to information linking. Stages of a trade lifecycle are managed by several systems webbed together in a robust transaction processing pipeline. This pipeline includes all events from an order to payment and everything in between (e.g., executions, intercompany splits, allocations, novation, confirmation, cash payments, and/or other trading events). In some instances, however, these systems might not have the core ability to link all lifecycle events together. For example, each system in the pipeline may generate transaction identifiers that might not be consistently carried over in the subsequent stages of the lifecycle. Furthermore, there might not be a common identifier that is propagated through the pipeline.

Accordingly, one or more of the systems and methods described herein provide technical solutions to address one or more of these technical deficiencies. To do so, the aspects described herein do not implement replacing or modifying the core of existing systems, nor does they create another redundant data warehouse or data lake by copying the transaction details from various systems. Rather, as described herein, core capabilities are leveraged and current investments are protected while providing a solution that does not impact the core of the current architecture. For example, each system that generates new transactions and relationships may send link information, created by the corresponding system, to a central repository.

More specifically, a solution implementing one or more aspects of the disclosure may have four primary components. First, each system that creates new transaction and/or relationships may provide an end of the day snapshot of its relationship to a central repository. This may result in a centrally governed model that describes the relationships between identifiers (and thus between systems). Each system may be responsible for providing identifiers it received, identifiers it generated, and descriptions of the relationships between the received/generated identifiers. Second, a central data store may receive the linkage information and store it in a graph or other database, which may configure the central data store to easily query relationships between identifiers. Third, data services from this central repository may include a set of application programmable interfaces (APIs) that may provide details on relationships. For example, the APIs may provide related order identifiers based on a set of allocation identifiers. As another example, the APIs may provide payment references based on a set of trade identifiers. Accordingly, any system may now receive disparate sets of transaction data from two systems and relate the transactions using the link data queried via the API. This may serve regulatory reporting needs and/or internal analytical needs. Fourth, for ad-hoc use of investigating and researching transactions, a web user interface may be used to query data based on transaction identifiers, product details, client details, and/or other trade information. In some instances, a host system may be able to access full transaction details to provide a user with a full detailed view of an end-to-end transaction.

In doing so, one or more of the systems and methods described herein provide a low cost, low risk solution that has a short time to market and may be built in a true agile manner without any impact to systems core processing capabilities, and that may be configured to provide end to end transaction details. Furthermore, replacement or modification of the core of existing systems is not necessary, nor is a redundant data warehouse created by copying transaction details from various systems. Rather, described herein are one or more systems and methods that leverage core capabilities and protect current investments while creating a solution that does not impact the core of the current computing architecture. Instead, each system that generates new transactions and relationships may send linkage and/or identifier information that may be stored at a central repository. This may allow for generation of analytics and/or metrics that may otherwise be too expensive (e.g., data may be too difficult to locate and/or manually intensive to pull, tracing events through upstream systems may be time consuming and/or there may be other difficulties).

In addition, one or more of the systems and methods described herein may result in benefits related to operational efficiency. For example, researching full audit trails of trades may involve operations teams having to access multiple systems and/or engage multiple support teams. Accordingly, having a way to look up the full lifecycle details based on a single transaction identifier may be useful. Furthermore, one or more of the systems and methods described herein may result in regulatory benefits. For example, regulatory exams may need transaction data that is correlated across multiple systems, and thus may be made more efficient through the information linkages described herein. As yet an additional benefit, one or more of the systems and methods described herein may provide the ability to view end to end flows of transactions and thus may provide additional insights into trade processing. In addition, one or more of the systems and methods described herein may result in data lineage benefits. For example, implementing the linkages described herein may provide a realistic view of transaction lineages that may be dynamically generated at any given point in time.

Figure 1B:
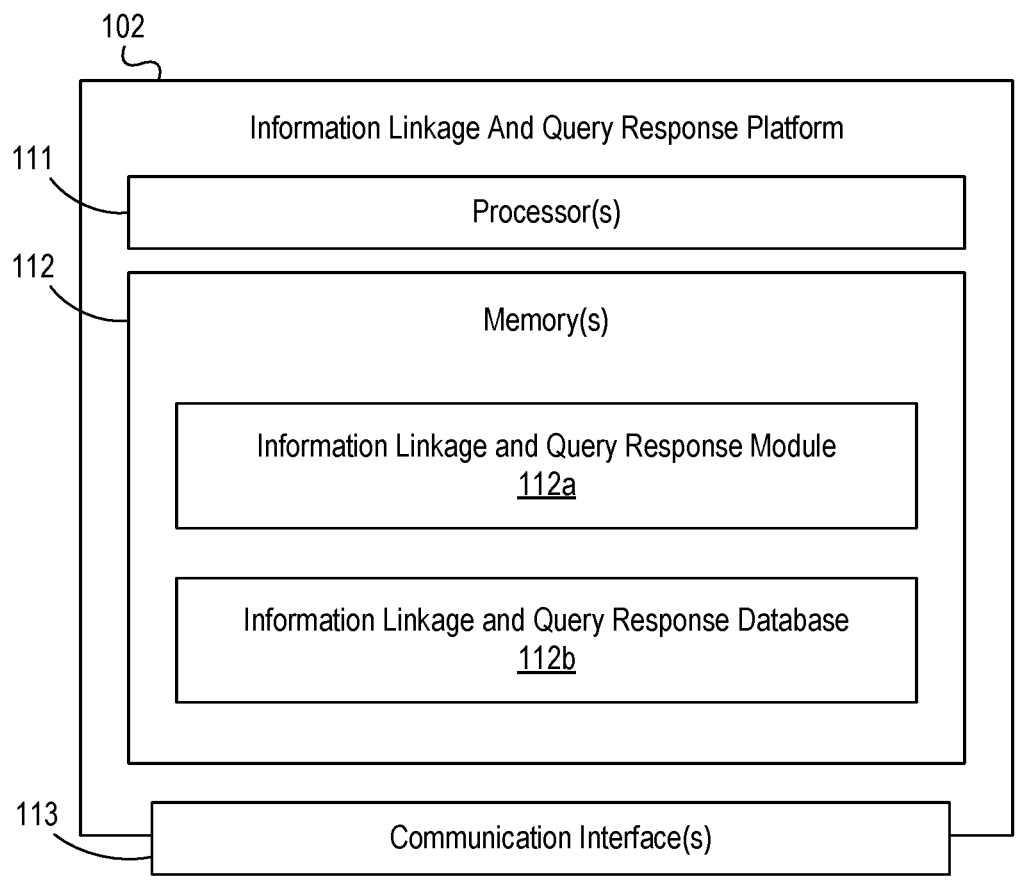

FIGS. 1A-1B depict an illustrative computing environment that implements information linkage for enhanced tracking of processed events in accordance with one or more example embodiments. Referring to FIG. 1A, computing environment 100 may include one or more computer systems. For example, computing environment 100 may include an information linkage and query response platform 102, first event processing system 103, second event processing system 104, third event processing system 105, client device 106, and administrator computing device 107.

As described further below, information linkage and query response platform 102 may be a computer system that includes one or more computing devices (e.g., servers, server blades, or the like) and/or other computer components (e.g., processors, memories, communication interfaces) that may be used to host and maintain linkage information between various system identifiers and/or event processing identifiers. In some instances, these system identifiers may be used by the information linkage and query response platform 102 to identify all systems involved in the processing of a particular event, and subsequently to communicate with the identified systems for additional processing information specific to each identified system.

First event processing system 103 may include one or more computing devices and/or other computer components (e.g., processors, memories, communication interfaces), and may be configured to perform one or more functions related to event processing (e.g., processing of a trade, or other events). For example, the first event processing system 103 may be an order management system, an execution system, an allocation system, a usage system, a clearing system, a confirmation system, a payment system, a request for quote system, a settlement system, a position keeping system, and/or other systems involved in event processing.

Second event processing system 104 may include one or more computing devices and/or other computer components (e.g., processors, memories, communication interfaces), and may be configured to perform one or more functions related to event processing (e.g., processing of a trade, or other events). For example, the second event processing system 104 may be an order management system, an execution system, an allocation system, a usage system, a clearing system, a confirmation system, a payment system, a request for quote system, a settlement system, a position keeping system, and/or other systems involved in event processing. In some instances, the second event processing system 104 may be configured to perform one or more different tasks than the first event processing system 103.

Third event processing system 105 may include one or more computing devices and/or other computer components (e.g., processors, memories, communication interfaces), and may be configured to perform one or more functions related to event processing (e.g., processing of a trade, or other events). For example, the third event processing system 105 may be an order management system, an execution system, an allocation system, a usage system, a clearing system, a confirmation system, a payment system, and/or other systems involved in event processing. In some instances, the third event processing system 105 may be configured to perform one or more different tasks than the first event processing system 103 and/or second event processing system 104.

Client device 106 may be a laptop computer, desktop computer, mobile device, tablet, smartphone, or the like that may be used by an individual such as a client of an enterprise organization (e.g., a financial institution, or the like). For example, the client device 106 may be used by one or more individuals to request or otherwise initiate processing of events (e.g., trades and/or other financial transactions). In some instances, client device 106 may be configured to display one or more user interfaces.

Administrator computing device 107 may be a laptop computer, desktop computer, mobile device, tablet, smartphone, or the like that may be used by an individual such as an employee of an enterprise organization (e.g., a financial institution, or the like) and/or a regulatory agency. For example, the administrator computing device 107 may be used by one or more individuals to monitor or otherwise review processing of events (e.g., trades and/or other financial transactions). In some instances, administrator computing device 107 may be configured to display one or more user interfaces (e.g., event processing review and/or other interfaces).

Computing environment 100 also may include one or more networks, which may interconnect information linkage and query response platform 102, first event processing system 103, second event processing system 104, third event processing system 105, client device 106, and/or administrator computing device 107. For example, computing environment 100 may include a network 101 (which may interconnect, e.g., information linkage and query response platform 102, first event processing system 103, second event processing system 104, third event processing system 105, client device 106, and/or administrator computing device 107).

In one or more arrangements, information linkage and query response platform 102, first event processing system 103, second event processing system 104, third event processing system 105, client device 106, and/or administrator computing device 107 may be any type of computing device capable of sending and/or receiving requests and processing the requests accordingly. For example, information linkage and query response platform 102, first event processing system 103, second event processing system 104, third event processing system 105, client device 106, administrator computing device 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of information linkage and query response platform 102, first event processing system 103, second event processing system 104, third event processing system 105, client device 106, and/or administrator computing device 107, may, in some instances, be special-purpose computing devices configured to perform specific functions.

Referring to FIG. 1B, information linkage and query response platform 102 may include one or more processors 111, memory 112, and communication interface 113. A data bus may interconnect processor 111, memory 112, and communication interface 113. Communication interface 113 may be a network interface configured to support communication between information linkage and query response platform 102 and one or more networks (e.g., network 101, or the like). Memory 112 may include one or more program modules having instructions that when executed by processor 111 cause information linkage and query response platform 102 to perform one or more functions described herein and/or one or more databases that may store and/or otherwise maintain information which may be used by such program modules and/or processor 111. In some instances, the one or more program modules and/or databases may be stored by and/or maintained in different memory units of information linkage and query response platform 102 and/or by different computing devices that may form and/or otherwise make up information linkage and query response platform 102. For example, memory 112 may have, host, store, and/or include information linkage and query response module 112a and an information linkage and query response database 112b.

Information linkage and query response module 112a may have instructions that direct and/or cause information linkage and query response platform 102 to execute advanced techniques to provide one or more information linkage and query response functions, such as linkage of information, related to processing of a particular event, that is generated by or otherwise corresponds to various event processing systems. Information linkage and query response database 112*b* may store information used by information linkage and query response module 112*a* and/or information linkage and query response platform 102 in application of advanced techniques to provide one or more information linkage and query response functions, and/or in performing other functions.

Figure 2A:
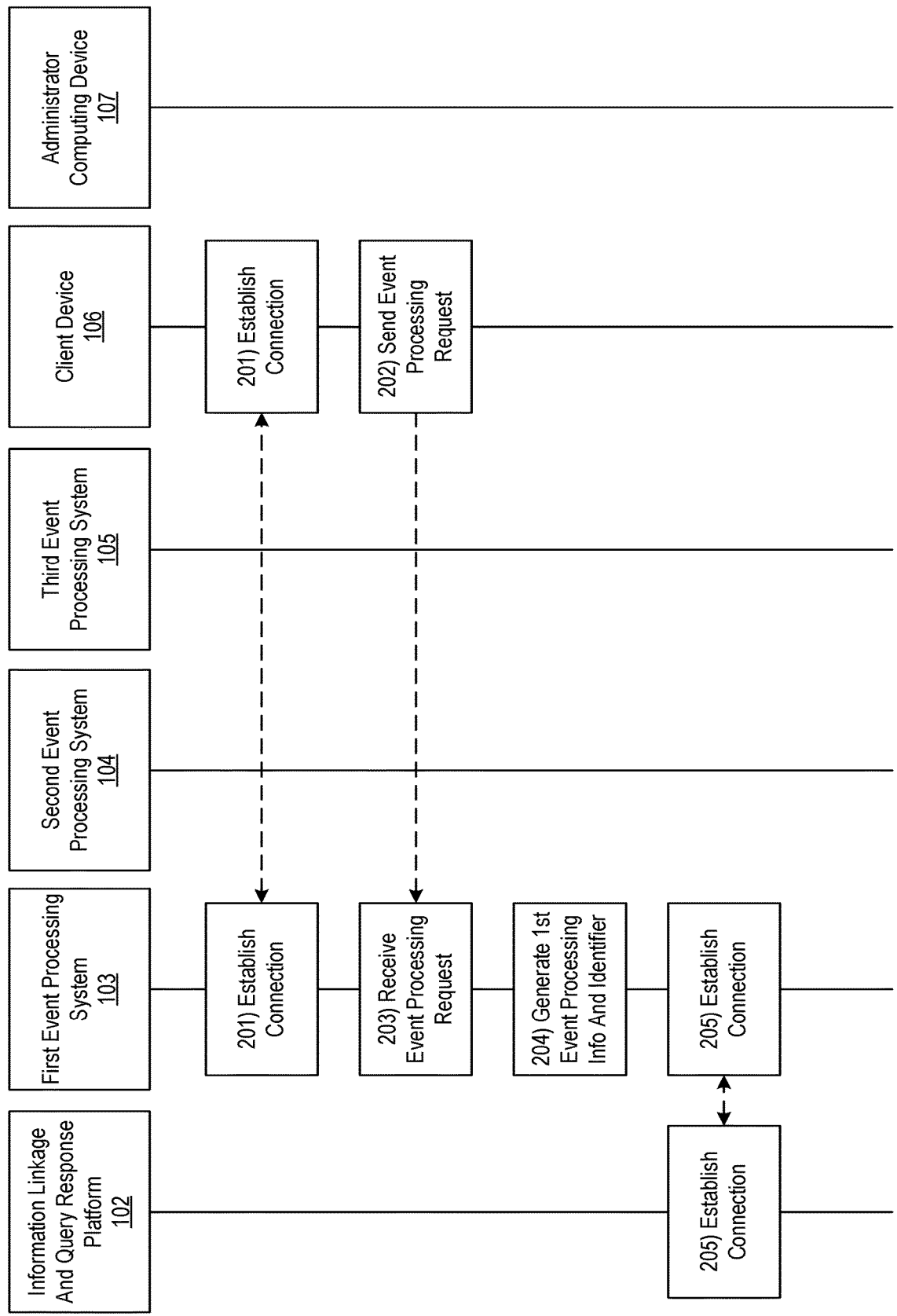

FIGS. 2A-2G depict an illustrative event sequence for implementing information linkage for enhanced tracking of processed events in accordance with one or more example embodiments. Referring to FIG. 2A, at step 201, the client device 106 may establish a first connection with the first event processing system 103. For example, the client device 106 may establish a first wireless data connection with the first event processing system 103 to link the client device 106 to the first event processing system 103 (e.g., in preparation for sending a request to process an event, such as a stock trade or another type of transaction, such as a purchase, sale, or other transaction involving one or more securities). In some instances, the client device 106 may identify whether or not a connection is already established with the first event processing system 103. If a connection is already established with the first event processing system 103, the client device 106 might not re-establish the connection. If a connection is not yet established with the first event processing system 103, the client device 106 may establish the first wireless data connection as described herein.

At step 202, the client device 106 may send an event processing request to the first event processing system 103. For example, the client device 106 may send a request to initiate processing of a trade or other financial transaction. In some instances, the client device 106 may send the event processing request to the first event processing system 103 because the first event processing system 103 may be one of a plurality of systems involved in processing the requested event, and the first event processing system 103 may be configured to perform one or more processing steps that occur prior to the processing steps performed by the remaining systems in the plurality of systems. For example, the first event processing system 103 may be an order management system, which may be configured to route processing requests to various additional systems. In some instances, the client device 106 may send the event processing request to the first event processing system 103 while the first wireless data connection is established.

At step 203, the first event processing system 103 may receive the event processing request sent at step 202. For example, the first event processing system 103 may receive the event processing request via the communication interface and while the first wireless data connection is established.

At step 204, the first event processing system 103 may generate first event processing information and a first event processing identifier. For example, in generating the first event processing information, the first event processing system 103 may perform one or more tasks related to processing the event. For example, in instances where the first event processing system 103 is an order management system, the first event processing system 103 may generate first event processing information indicating which other systems should be communicated with to process the particular event (e.g., to create and/or otherwise initiate an order for one or more securities associated with a transaction corresponding to the event). In generating the first event processing identifier, the first event processing system 103 may generate an identifier that corresponds to the first event processing system 103, and may be used by other systems (e.g., the information linkage and query response platform 102) to identify the first event processing system 103.

At step 205, the first event processing system 103 may establish a connection with the information linkage and query response platform 102. For example, the first event processing system 103 may establish a second wireless data connection with the information linkage and query response platform 102 to link the first event processing system 103 to the information linkage and query response platform 102 (e.g., in preparation for sending the first event processing identifier). In some instances, the first event processing system 103 may identify whether or not a connection is established with the information linkage and query response platform 102. If a connection is already established with the information linkage and query response platform 102, the first event processing system 103 might not re-establish the connection. If a connection is not yet established with the information linkage and query response platform 102, the first event processing system 103 may establish the second wireless data connection as described herein.

Figure 2B:
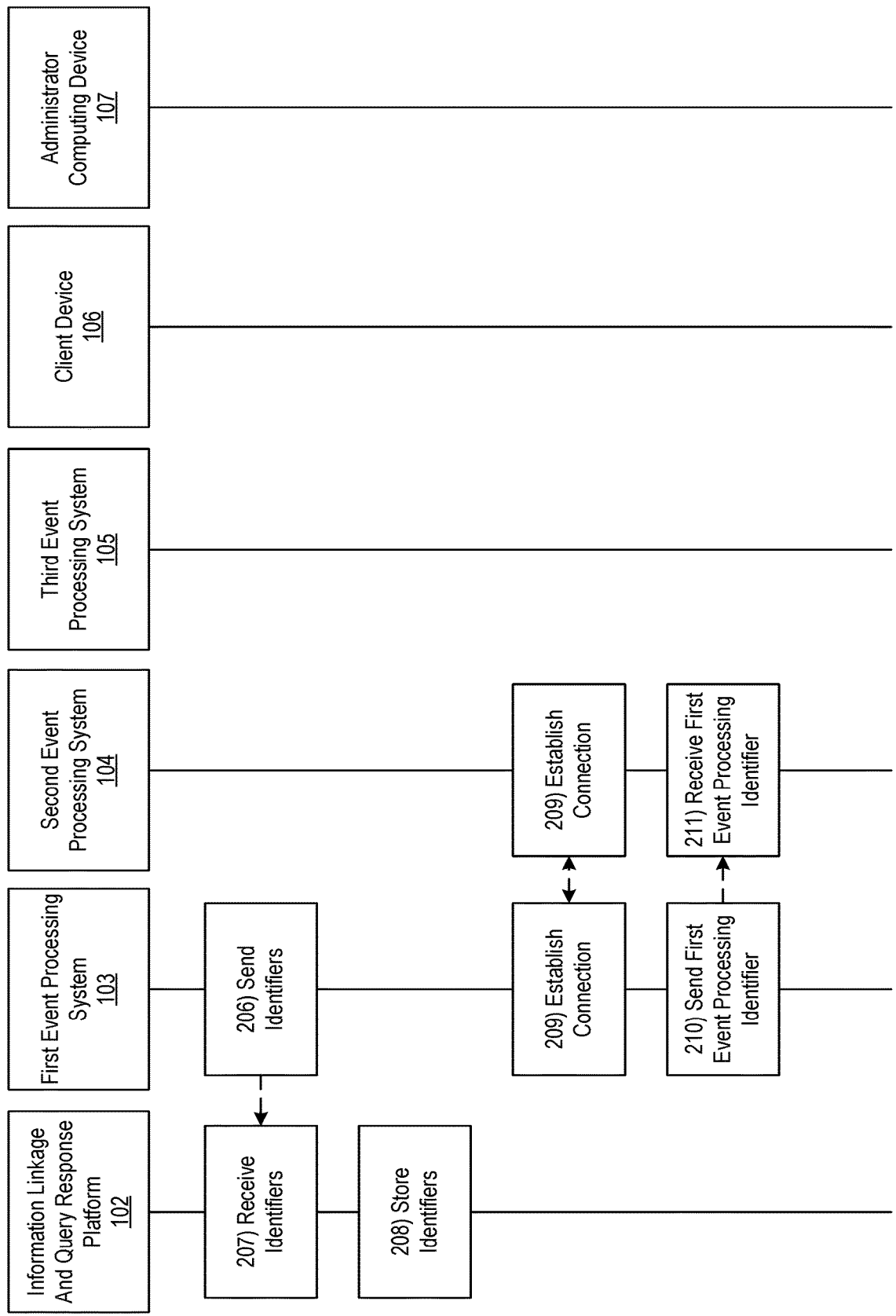

Referring to FIG. 2B, at step 206, first event processing system 103 may send the first event processing identifier to the information linkage and query response platform 102. For example, the first event processing system 103 may send the first event processing identifier to the information linkage and query response platform 102 while the second wireless data connection is established. In some instances, in addition to sending the first event processing identifier, the first event processing system 103 may send a client identifier that may be used to identify the client device 106. For example, the first event processing system 103 may have received the client identifier from the client device 106 along with the event processing request at step 203. In some instances, the first event processing system 103 may send a snapshot at a predetermined interval (e.g., 5 PM each day, or another time) that includes event processing identifiers received and/or generated during the interval and a description relating the event processing identifiers corresponding to particular events.

At step 207, the information linkage and query response platform 102 may receive the first event processing identifier sent at step 206. In some instances, the information linkage and query response platform 102 may receive the first event processing identifier via the communication interface 113 and while the second wireless data connection is established. In some instances, the information linkage and query response platform 102 may receive the client identifier along with the first event processing identifier.

At step 208, the information linkage and query response platform 102 may store the first event processing identifier and/or the client identifier received at step 207. For example, the information linkage and query response platform 102 may store the first event processing identifier and/or the client identifier in a portion (e.g., a cell, row, column, table, and/or other portion) of a database that corresponds to the particular event requested at step 202. For example, the information linkage and query response platform 102 may store a correlation between the client identifier, the first event processing identifier, and the particular event. In doing so, the information linkage and query response platform 102 may identify that the first event processing system 103 and/or client device 106 were involved in processing of the particular event. In some instances, the information linkage and query response platform 102 may configure the stored data so that it may be used to query corresponding systems for additional data. For example, the information linkage and query response platform 102 may identify, using the first event processing identifier, that the first event processing system 103 was involved in processing the particular event, and may query the first event processing system 103 for additional information related to processing the event (e.g., the first event processing information).

At step 209, the first event processing system 103 may establish a connection with the second event processing system 104. For example, the first event processing system 103 may establish a third wireless data connection with second event processing system 104 to link the first event processing system 103 with the second event processing system 104 (e.g., in preparation for sending the first event processing identifier to the second event processing system 104).

At step 210, the first event processing system 103 may send the first event processing identifier to the second event processing system 104. For example, the first event processing system 103 may send the first event processing identifier to the second event processing system 104 while the third wireless data connection is established.

At step 211, the second event processing system 104 may receive the first event processing identifier sent at step 210. For example, the second event processing system 104 may receive the first event processing identifier while the third wireless data connection is established.

Figure 2C:
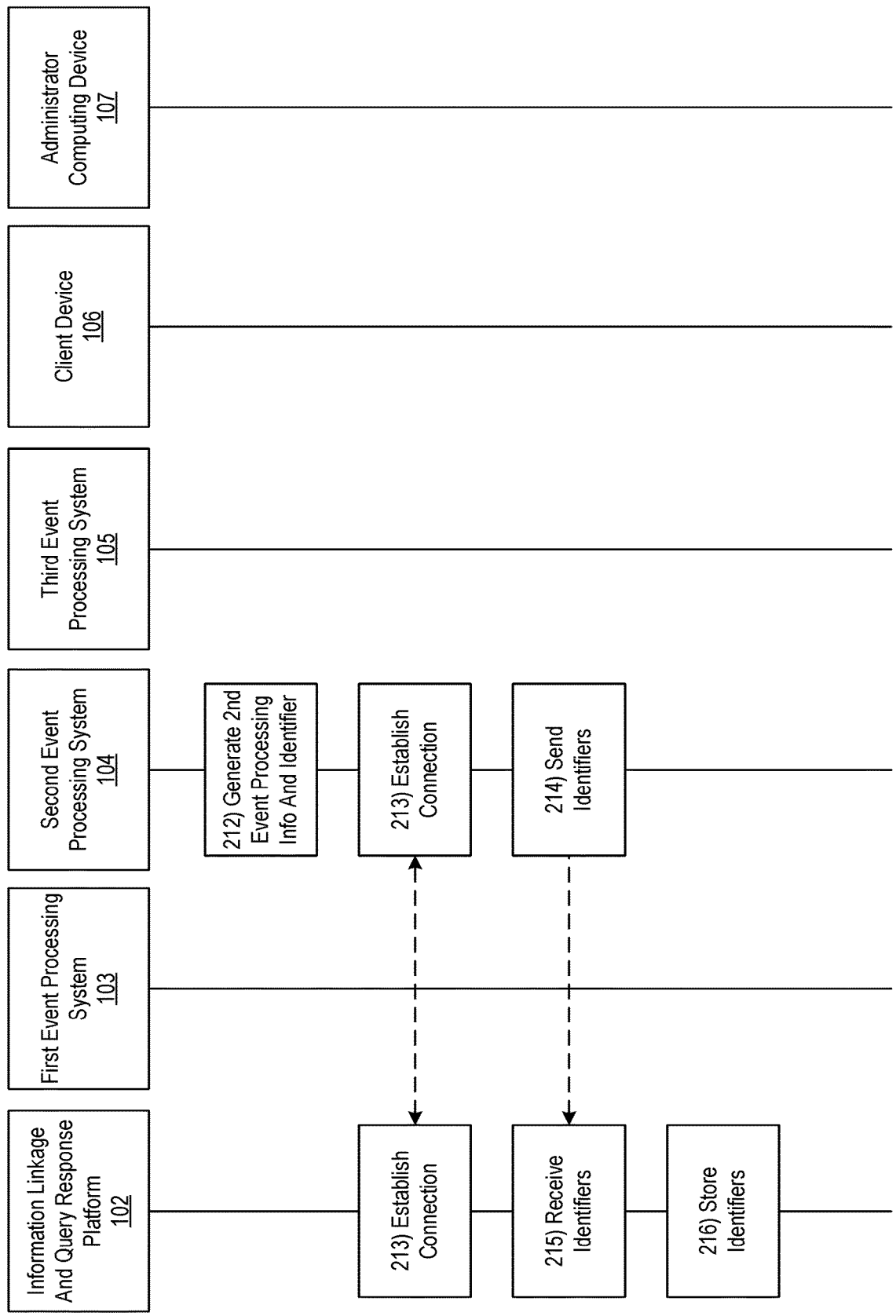

Referring to FIG. 2C, at step 212, second event processing system 104 may generate second event processing information and a second event processing identifier. For example, in generating the second event processing information, the second event processing system 104 may perform one or more tasks related to processing the event. For example, in instances where the second event processing system 104 is an execution system, the second event processing system 104 may generate second event processing information corresponding to execution of the particular event (e.g., corresponding to execution of a stock trade or other transaction, such as a trade of one or more mutual funds, index funds, or other assets). In generating the second event processing identifier, the second event processing system 104 may generate an identifier that corresponds to the second event processing system 104, and may be used by other systems (e.g., the information linkage and query response platform 102) to identify the second event processing system 104. In some instances, in generating the second event processing identifier, the second event processing system 104 may perform one or more actions similar to those described above at step 204 with regard to generation of the first event processing identifier by the first event processing system 103.

At step 213, the second event processing system 104 may establish a connection with the information linkage and query response platform 102. For example, the second event processing system 104 may establish a fourth wireless data connection to link the second event processing system 104 to the information linkage and query response platform 102 (e.g., in preparation for sending the first and second event processing identifiers). In some instances, the second event processing system 104 may identify whether or not a connection is already established with the information linkage and query response platform 102. If a connection is already established with the information linkage and query response platform 102, the second event processing system 104 might not re-establish the connection. If a connection is not yet established with the information linkage and query response platform 102, the second event processing system 104 may establish the fourth wireless data connection as described herein.

At step 214, the second event processing system 104 may send the first event processing identifier (received from the first event processing system 103) and the second event processing identifier (generated at step 212) to the information linkage and query response platform 102. For example, the second event processing system 104 may send the first event processing identifier and the second event processing identifier to the information linkage and query response platform 102 while the fourth wireless data connection is established. In some instances, the second event processing system 104 may send a snapshot at a predetermined interval (e.g., 5 PM each day, or another time) that includes event processing identifiers received and/or generated during the interval and a description relating the event processing identifiers corresponding to particular events. By sending the first event processing identifier and the second event processing identifier to the information linkage and query response platform 102, the second event processing system 104 may indicate which system it received the first event processing identifier from (e.g., the first event processing system 103), what type of system the first event processing identifier corresponds to (e.g., an order management system), and its own identifier.

At step 215, the information linkage and query response platform 102 may receive the first event processing identifier and the second event processing identifier sent at step 214. For example, the information linkage and query response platform 102 may receive the first event processing identifier and the second event processing identifier via the communication interface 113 and while the fourth wireless data connection is established.

At step 216, the information linkage and query response platform 102 may store the second event processing identifier received at step 215. For example, the information linkage and query response platform 102 may identify, based on the receipt of the first event processing identifier and the second event processing identifier, that a relationship between the first event processing identifier and the second event processing identifier should be stored. Accordingly, the information linkage and query response platform 102 may store the second event processing identifier in the same portion (e.g., a cell, row, column, table, and/or other portion) of the database that includes the first event processing identifier and the client identifier (e.g., described above at step 208). For example, the information linkage and query response platform 102 may store a correlation between the client identifier, the first event processing identifier, the second event processing identifier, and the particular event. In doing so, the information linkage and query response platform 102 may identify that the second event processing system 104, the first event processing system 103 and/or client device 106 were involved in processing of the particular event. In some instances, the information linkage and query response platform 102 may configure the stored data so that it may be used to query corresponding systems for additional data. For example, the information linkage and query response platform 102 may identify, using the second event processing identifier, that the second event processing system 104 was involved in processing the particular event, and may query the second event processing system 104 for additional information related to processing the event (e.g., the second event processing information). In some instances, actions performed at step 216 may be similar to those described above with regard to storage of the client identifier and/or the first event processing identifier at step 208.

Figure 2D:
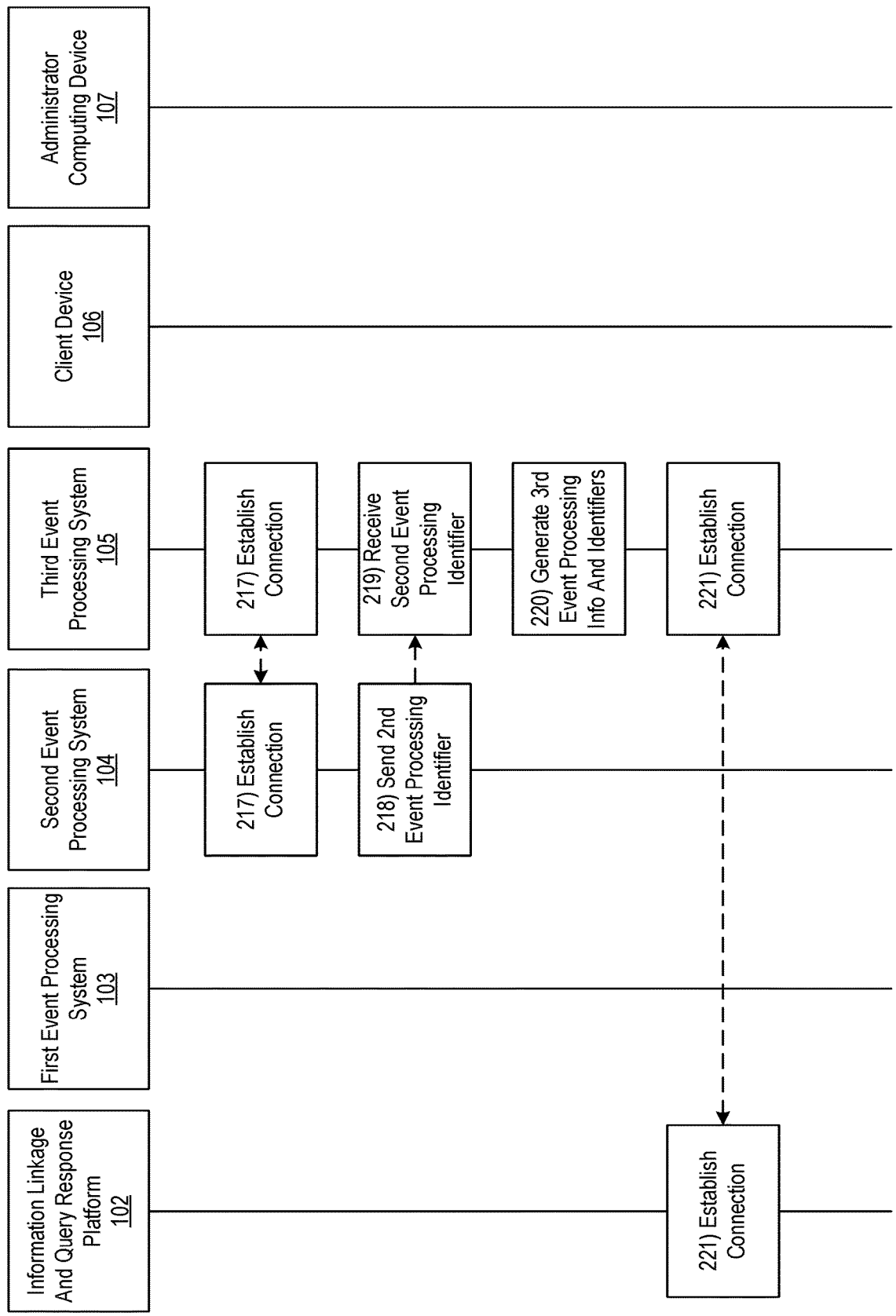

Referring to FIG. 2D, at step 217, the second event processing system 104 may establish a connection with the third event processing system 105. For example, the second event processing system 104 may establish a fifth wireless data connection with the third event processing system 105 to link the second event processing system 104 to the third event processing system 105 (e.g., in preparation for sending the second event processing identifier). In some instances, the second event processing system 104 may identify whether or not a connection is already established with the third event processing system 105. If a connection is already established with the third event processing system 105, the second event processing system 104 might not re-establish the connection. If a connection is not yet established with the third event processing system 105, the second event processing system 104 may establish the fifth wireless data connection as described herein.

At step 218, the second event processing system 104 may send the second event processing identifier to the third event processing system 105. For example, the second event processing system 104 may send the second event processing identifier to the third event processing system 105 while the fifth wireless data connection is established.

At step 219, the third event processing system 105 may receive the second event processing identifier, sent at step 218. For example, the third event processing system 105 may receive the second event processing identifier while the fifth wireless data connection is established.

At step 220, the third event processing system 105 may generate third event processing information and a third event processing identifier. For example, in generating the third event processing information, the third event processing system 105 may perform one or more tasks related to processing the event. For example, in instances where the third event processing system 105 is an allocation system, the third event processing system 105 may generate third event processing information corresponding to trade allocations (e.g., blocking together multiple requested trades corresponding to a common enterprise organization). In generating the third event processing identifier, the third event processing system 105 may generate an identifier that corresponds to the third event processing system 105, and may be used by other systems (e.g., the information linkage and query response platform 102) to identify the third event processing system 105. In some instances, in generating the third event processing identifier, the third event processing system 105 may perform one or more actions similar to those described above at step 204 with regard to generation of the first event processing identifier by the first event processing system 103 and/or at step 212 with regard to generation of the second event processing identifier by the second event processing system 104.

At step 221, the third event processing system 105 may establish a connection with the information linkage and query response platform 102. For example, the third event processing system 105 may establish a sixth wireless data connection with the information linkage and query response platform 102 to link the third event processing system 105 to the information linkage and query response platform 102 (e.g., in preparation for sending the third event processing identifier). In some instances, the third event processing system 105 may identify whether a connection is already established with the information linkage and query response platform 102. If a connection is already established with the information linkage and query response platform 102, the third event processing system 105 might not re-establish the connection. If a connection is not yet established with the information linkage and query response platform 102, the third event processing system 105 may establish the sixth wireless data connection as described herein.

Figure 2E:
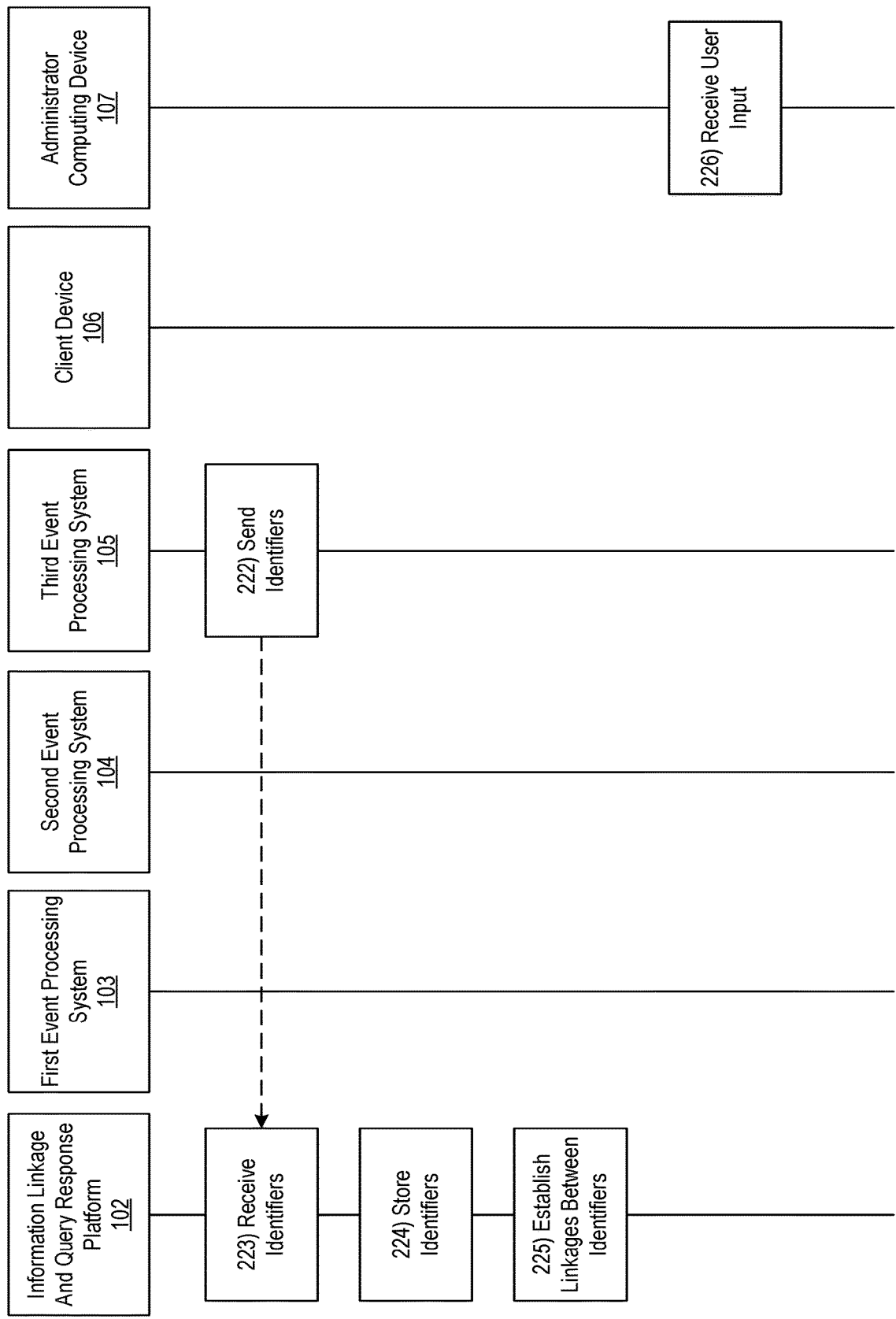

Referring to FIG. 2E, at step 222, third event processing system 105 may send the second event processing information (received at step 219) and the third event processing information (generated at step 220) to the information linkage and query response platform 102. In some instances, the third event processing system 105 may send the second event processing information and the third event processing information to the information linkage and query response platform 102 while the sixth wireless data connection is established. In some instances, the third event processing system 105 may send a snapshot at a predetermined interval (e.g., 5 PM each day, or another time) that includes event processing identifiers received and/or generated during the interval and a description relating the event processing identifiers corresponding to particular events. By sending the second event processing identifier and the third event processing identifier to the information linkage and query response platform 102, the third event processing system 105 may indicate which system it received the second event processing identifier from (e.g., the second event processing system 104), what type of system the second event processing identifier corresponds to (e.g., an execution system), and its own identifier.

At step 223, the information linkage and query response platform 102 may receive the second event processing information and the third event processing information from the third event processing system 105. For example, the information linkage and query response platform 102 may receive the second event processing information and the third event processing information while the sixth wireless data connection is established.

At step 224, the information linkage and query response platform 102 may store the third event processing identifier received at step 223. For example, the information linkage and query response platform 102 may identify, based on the receipt of the second event processing identifier and the third event processing identifier, that a relationship between the second event processing identifier and the third event processing identifier should be stored. Accordingly, the information linkage and query response platform 102 may store the third event processing identifier in the same portion (e.g., a cell, row, column, table, and/or other portion) of the database that includes the second event processing identifier, the first event processing identifier and the client identifier (e.g., described above at steps 208 and 216). For example, the information linkage and query response platform 102 may store a correlation between the client identifier, the first event processing identifier, the second event processing identifier, the third event processing identifier, and the particular event. In doing so, the information linkage and query response platform 102 may identify that the third event processing system 105, the second event processing system 104, the first event processing system 103 and/or client device 106 were involved in processing of the particular event. In some instances, the information linkage and query response platform 102 may configure the stored data so that it may be used to query corresponding systems for additional data. For example, the information linkage and query response platform 102 may identify, using the third event processing identifier, that the third event processing system 105 was involved in processing the particular event, and may query the third event processing system 105 for additional information related to processing the event (e.g., the third event processing information). In some instances, actions performed at step 224 may be similar to those described above with regard to storage of the client identifier and/or the first event processing identifier at steps 208 and 216.

At step 225, the information linkage and query response platform 102 may establish linkages between the client identifier, the first event processing identifier, the second event processor identifier, and the third event processing identifier. For example, based on receipt of the client identifier from the first event processing system 103, the information linkage and query response platform 102 may identify that the event processing request corresponding to the particular event originated at the client device 106 and that processing began with the first event processing system 103. The information linkage and query response platform 102 may further identify, based on the receipt of the first event processing identifier and the second event processing identifier from the second event processing system 104, that the first event processing system 103 handed off processing of the particular event to the second event processing system 104. The information linkage and query response platform 102 may further identify, based on receipt of the second event processing identifier and the third event processing identifier from the third event processing system 105, that the second event processing system 104 handed off processing of the particular event to the third event processing system 105. Accordingly, the information linkage and query response platform 102 may generate and store event linkage information (e.g., correlations between the client device 106, the third event processing system 105, the second event processing system 104, and the first event processing system 103 themselves, and with the particular event) for the particular event. In some instances, the information linkage and query response platform 102 may store the linkage information in a graphing database. By doing so, the information linkage and query response platform 102 may store a complete record of all systems involved in processing of the particular event. For example, the information linkage and query response platform 102 may store information indicating what each system independently created and what each system received from other systems.

At step 226, the administrator computing device 107 may receive a user input requesting access to lifecycle information corresponding to the particular event. For example, the administrator computing device 107 may receive a user input from a client, enterprise administrator, compliance monitoring officer, and/or other individuals requesting access to processing of a stock trade (e.g., what systems were involved, what actions did they perform, and/or other information related to the trade) and/or other financial transaction.

Figure 2F:
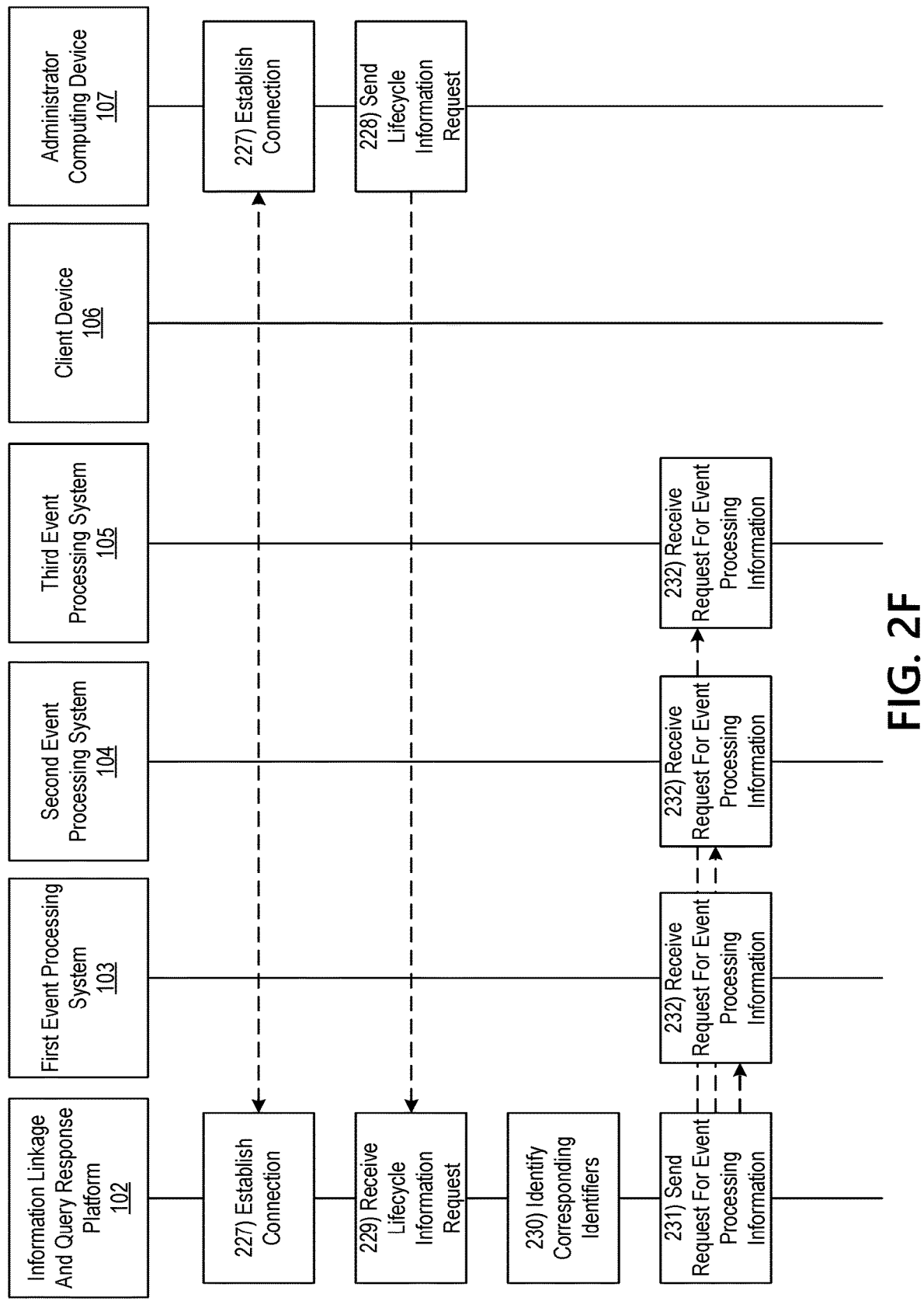

Referring to FIG. 2F, at step 227, the administrator computing device 107 may establish a connection with the information linkage and query response platform 102. For example, the administrator computing device 107 may establish a seventh wireless data connection with the information linkage and query response platform 102 to link the administrator computing device 107 to the information linkage and query response platform 102 (e.g., in preparation for sending a request for the event lifecycle information). In some instances, the administrator computing device 107 may identify whether or not a connection is already established with the information linkage and query response platform 102. If a connection is already established with the information linkage and query response platform 102, the administrator computing device 107 might not re-establish the connection. If a connection is not yet established with the information linkage and query response platform 102, the administrator computing device 107 may establish the seventh wireless data connection as described herein.

At step 228, the administrator computing device 107 may send a request for event lifecycle information corresponding to the particular event. For example, the administrator computing device 107 may send the request for event lifecycle information to the information linkage and query response platform 102 while the seventh wireless data connection is established.

At step 229, the information linkage and query response platform 102 may receive a request for event lifecycle information from the administrator computing device 107. For example, the information linkage and query response platform 102 may receive the request for event lifecycle information via the communication interface 113 and while the seventh wireless data connection is established.

At step 230, the information linkage and query response platform 102 may identify, using the event linkage information generated at step 225, event processing identifiers corresponding to the particular event (e.g., for which event lifecycle information was requested at step 228). For example, the information linkage and query response platform 102 may access the portion of the database that corresponds to the particular event, and may identify, using the event processing identifiers stored in that portion of the database, which systems were involved in processing the particular event. For example, the information linkage and query response platform 102 may identify, based on the first event processing identifier, the second event processing identifier, the third event processing identifier, and the client identifier, that the first event processing system 103, the second event processing system 104, the third event processing system 105, and the client device 106 were involved in processing the particular event.

At step 231, the information linkage and query response platform 102 may send requests for system-specific event processing information to the systems identified at step 230 (e.g., the first event processing system 103, the second event processing system 104, and the third event processing system 105). For example, the information linkage and query response platform 102 may send the request for system-specific event processing information to the first event processing system 103, the second event processing system 104, and the third event processing system 105 via the communication interface 113 and while the second, fourth, and sixth wireless data connections are respectively established.

At step 232, the first event processing system 103, second event processing system 104, and third event processing system 105 may receive the requests for system-specific event processing information sent at step 231. For example, the first event processing system 103, second event processing system 104, and third event processing system 105 may receive the requests for event processing information while the second, fourth, and sixth wireless data connections are established.

Referring to FIG. 2G, at step 233, the first event processing system 103, second event processing system 104, and third event processing system 105 may send system-specific event lifecycle information, which may be event processing information corresponding to the particular event (e.g., the first event processing information generated at step 204, the second event processing information generated at step 212, and the third event processing information generated at step 220, which may, in some instances, include actions performed by each system to process a trade or other financial transaction) to the information linkage and query response platform 102. In some instances, in sending the system-specific event lifecycle information, the first event processing system 103, second event processing system 104, and third event processing system 105 may each send unique information. For example, the first event processing system 103, second event processing system 104, and third event processing system 105 may send the first, second, and third event processing information while the second, fourth, and sixth wireless data connections are respectively established.

At step 234, the information linkage and query response platform 102 may receive system-specific event lifecycle information (e.g., the first, second, and third event processing information) from the first event processing system 103, second event processing system 104, and third event processing system 105 respectively. For example, the information linkage and query response platform 102 may receive the first, second, and third event processing information via the communication interface 113 and while the second, fourth, and sixth wireless data connections are respectively established.

At step 235, the information linkage and query response platform 102 may generate an event lifecycle interface based on the systems identified at step 230 and/or the event processing information received at step 234. In some instances, in generating the event lifecycle interface, the information linkage and query response platform 102 may generate and host an application programming interface (API) repository that includes a set of APIs that may provide details on relationships between event processing identifiers. For example, the information linkage and query response platform 102 may host APIs that may provide corresponding order identifiers when provided with allocation identifiers. As another example, when provided with trade identifiers, the information linkage and query response platform 102 may host APIs that may provide payment references. Accordingly, by implementing this API repository, the information linkage and query response platform 102 may relate information (e.g., related to a trade or other financial transaction) from multiple different systems to a common event. In some instances, this may be advantageous for internal analytical needs and/or regulatory reporting.

Additionally or alternatively, in generating the event lifecycle interface, the information linkage and query response platform 102 may generate a web based user interface that may be used for investigating and/or researching previously processed events (e.g., trades and/or other financial transactions) to query data based on a transaction identifier, product details, client details, and/or other information. By generating such an interface, the information linkage and query response platform 102 may provide individuals with a full detailed view of end to end processing of an event.

In some instances, the information linkage and query response platform 102 may generate one or more commands directing the administrator computing device 107 to display the event lifecycle interface. The information linkage and query response platform 102 may send the event lifecycle interface and the one or more commands directing the administrator computing device 107 to display the event lifecycle interface via the communication interface 113 and while the seventh wireless data connection is established.

At step 236, the administrator computing device 107 may receive the event lifecycle interface and the one or more commands directing the administrator computing device 107 to display the event lifecycle interface. For example, the administrator computing device 107 may receive the event lifecycle interface and the one or more commands directing the administrator computing device 107 to display the event lifecycle interface while the seventh wireless data connection is established.

At step 237, based on or in response to the one or more commands directing the administrator computing device 107 to display the event lifecycle interface, the administrator computing device 107 may display the event lifecycle interface. For example, in displaying the event lifecycle interface, the administrator computing device 107 may display a graphical user interface similar to graphical user interface 305, which is shown in FIG. 3. For example, the administrator computing device 107 may display a list of the systems involved in processing the particular event, and may include links to access further information from each of the systems (e.g., the first, second, and/or third event processing information).

Although first event processing system 103, second event processing system 104, and third event processing system 105 are described herein, any number of event processing systems may be implemented using one or more of the methods described herein without departing from the scope of the disclosure. Furthermore, although the event lifecycle interface is described with regard to display at the administrator computing device 107, the event lifecycle interface may, in some instances, be displayed at the client device 106 without departing from the scope of the disclosure.

Figure 4:
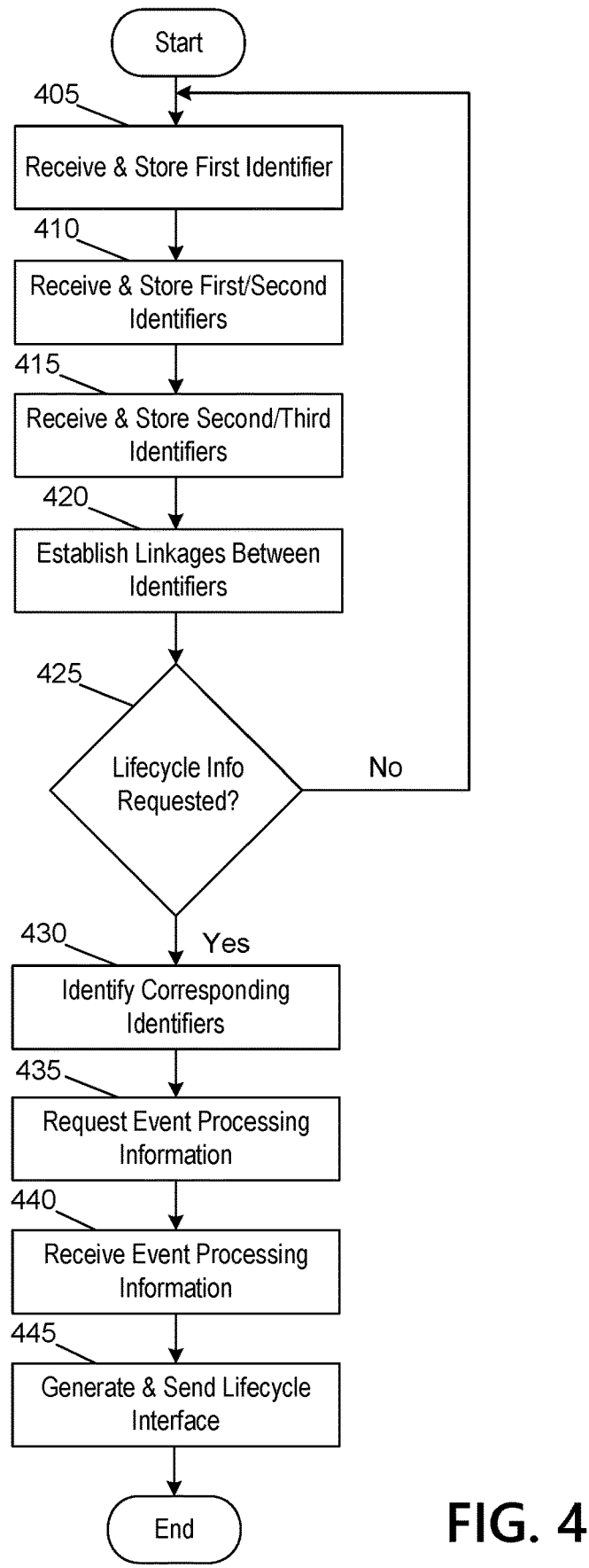
FIG. 4 depicts an illustrative method for implementing information linkage for enhanced tracking of processed events in accordance with one or more example embodiments.

FIG. 4 depicts an illustrative method for implementing information linkage for enhanced tracking of processed events in accordance with one or more example embodiments. Referring to FIG. 4, at step 405, a computing platform having at least one processor, a communication interface, and memory may receive and store a first event processing identifier from a first event processing system. At step 410, the computing platform may receive and store the first event processing identifier and a second event processing identifier from a second event processing system. At step 415, the computing platform may receive and store the second event processing identifier and a third event processing identifier from a third event processing system. At step 420, the computing platform may establish linkages between the first event processing identifier, the second event processing identifier, and the third event processing identifier. At step 425, the computing platform may identify whether or not event lifecycle information was requested. If event lifecycle information was not requested, the computing platform may return to step 405. If event lifecycle information was requested, the computing platform may proceed to step 430.

At step 430, the computing platform may identify event processing identifiers corresponding to the event lifecycle information requested at step 425. At step 435, the computing platform may request event processing information from event processing systems corresponding to the event processing identifiers. At step 440, the computing platform may receive the requested event processing information from the identified event processing systems. At step 445, the computing platform may generate an event lifecycle interface, based on the identified event processing systems and/or the received event processing information, and may send the event lifecycle interface to an administrator computing device for display.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
receive, from a plurality of event processing systems, event processing identifiers corresponding to various events, wherein each event processing identifier identifies a corresponding event processing system of the plurality of event processing systems, wherein the computing platform and the plurality of event processing systems are configured in a first configuration;
generate, by the computing platform and using the event processing identifiers corresponding to the various events, event linkage information corresponding to the various events;
store, by the computing platform, the event processing identifiers corresponding to the various events along with the event linkage information for each of the corresponding various events;
receive, by the computing platform and from an administrator computing device, a request to access event lifecycle information corresponding to a particular event of the various events;
identify, by the computing platform and using the event linkage information corresponding to the particular event, a subset of the plurality of event processing systems that performed actions associated with the particular event;
access, from each of the subset of the plurality of event processing systems and via an application programming interface (API) hosted by the computing platform, system-specific event lifecycle information corresponding to the particular event, wherein accessing the system-specific event lifecycle information corresponding to the particular event via the API avoids redundant storage of the system-specific event lifecycle information at the computing platform and the subset of the plurality of event processing systems without reconfiguring the first configuration;
generate, by the computing platform and using the system-specific event lifecycle information corresponding to the particular event, an event lifecycle interface and one or more commands directing the administrator computing device to display the event lifecycle interface;
send, by the computing platform and to the administrator computing device, the event lifecycle interface and the one or more commands directing the administrator computing device to display the event lifecycle interface; and
receive, by the administrator computing device and via the event lifecycle interface, user input requesting access to further information from the plurality of event processing systems, wherein the receipt of the user input causes the administrator computing device to access the further information from the plurality of event processing systems.

2. The computing platform of claim 1, wherein:
the plurality of event processing systems includes a first event processing system, a second event processing system, and a third event processing system, the system-specific event lifecycle information corresponding to the particular event includes first event lifecycle information from the first event processing system, second event lifecycle information from the second event processing system, and third event lifecycle information from the third event processing system, and the first event lifecycle information, the second event lifecycle information, and the third lifecycle information are unique from each other.

3. The computing platform of claim 2, wherein the event processing identifiers include a first event processing identifier corresponding to the first event processing system, a second event processing identifier corresponding to the second event processing system, and a third event processing identifier corresponding to the third event processing system.

4. The computing platform of claim 3, wherein:
the first event processing identifier is sent, from the first event processing system, to the computing platform and the second event processing system;
the second event processing identifier is sent, from the second event processing system, to the computing platform and the third event processing system; and
the third event processing identifier is sent, from the third event processing system, to the computing platform.

5. The computing platform of claim 4, wherein:
the second event processing identifier is received from the second event processing system along with the first event processing identifier; and
the third event processing identifier is received from the third event processing system along with the second event processing identifier.

6. The computing platform of claim 2, wherein:
the actions associated with the particular event include first actions performed by the first event processing system, second actions performed by the second event processing system, and third actions performed by the third event processing system,
the first event processing system completes the first actions before the second event processing system initiates the second actions; and
the second event processing system completes the second actions before the third event processing system initiates the third actions.

7. The computing platform of claim 1, wherein the plurality of event processing systems include one or more of: an order management system, an execution system, or an allocation system.

8. The computing platform of claim 1, wherein the particular event comprises a stock trade.

9. The computing platform of claim 8, wherein the event lifecycle information corresponding to the particular event indicates actions performed by each of the plurality of event processing systems to complete the stock trade.

10. A method comprising:
at a computing platform comprising at least one processor, a communication interface, and memory:
receiving, by the at least one processor and from a plurality of event processing systems, event processing identifiers corresponding to various events, wherein each event processing identifier identifies a corresponding event processing system of the plurality of event processing systems, wherein the computing platform and the plurality of event processing systems are configured in a first configuration;
generating, by the at least one processor of the computing platform and using the event processing identifiers corresponding to the various events, event linkage information corresponding to the various events;
storing, by the at least one processor of the computing platform, the event processing identifiers corresponding to the various events along with the event linkage information for each of the corresponding various events;
receiving, by the at least one processor of the computing platform and from an administrator computing device, a request to access event lifecycle information corresponding to a particular event of the various events;
identifying, by the at least one processor of the computing platform and using the event linkage information corresponding to the particular event, that a subset of the plurality of event processing systems that performed actions associated with the particular event;
accessing, by the at least one processor of the computing platform, from each of the subset of the plurality of event processing systems, and via an application programming interface (API) hosted by the computing platform, system-specific event lifecycle information corresponding to the particular event, wherein accessing the system-specific event lifecycle information corresponding to the particular event via the API avoids redundant storage of the system-specific event lifecycle information at the computing platform and the subset of the plurality of event processing systems without reconfiguring the first configuration;
generating, by the at least one processor of the computing platform and using the system-specific event lifecycle information corresponding to the particular event, an event lifecycle interface and one or more commands directing the administrator computing device to display the event lifecycle interface; and
sending, by the at least one processor of the computing platform and to the administrator computing device, the event lifecycle interface and the one or more commands directing the administrator computing device to display the event lifecycle interface; and
receive, by the administrator computing device and via the event lifecycle interface, user input requesting access to further information from the plurality of event processing systems, wherein the receipt of the user input causes the administrator computing device to access the further information from the plurality of event processing systems.

11. The method of claim 10, wherein:
the plurality of event processing systems includes a first event processing system, a second event processing system, and a third event processing system,
the system-specific event lifecycle information corresponding to the particular event includes first event lifecycle information from the first event processing system, second event lifecycle information from the second event processing system, and third event lifecycle information from the third event processing system, and
the first event lifecycle information, the second event lifecycle information, and the third lifecycle information are unique from each other.

12. The method of claim 11, wherein the event processing identifiers include a first event processing identifier corresponding to the first event processing system, a second event processing identifier corresponding to the second event processing system, and a third event processing identifier corresponding to the third event processing system.

13. The method of claim 12, wherein:
the first event processing identifier is sent, from the first event processing system, to the computing platform and the second event processing system;
the second event processing identifier is sent, from the second event processing system, to the computing platform and the third event processing system; and
the third event processing identifier is sent, from the third event processing system, to the computing platform.

14. The method of claim 13, wherein:
the second event processing identifier is received from the second event processing system along with the first event processing identifier; and
the third event processing identifier is received from the third event processing system along with the second event processing identifier.

15. The method of claim 11, wherein:
the actions associated with the particular event include first actions performed by the first event processing system, second actions performed by the second event processing system, and third actions performed by the third event processing system,
the first event processing system completes the first actions before the second event processing system initiates the second actions; and
the second event processing system completes the second actions before the third event processing system initiates the third actions.

16. The method of claim 10, wherein the plurality of event processing systems include one or more of: an order management system, an execution system, or an allocation system.

17. The method of claim 10, wherein the particular event comprises a stock trade.

18. The method of claim 17, wherein the event lifecycle information corresponding to the particular event indicates actions performed by each of the plurality of event processing systems to complete the stock trade.

19. One or more non-transitory computer-readable media storing instructions that, when executed by a computing platform comprising at least one processor, a communication interface, and memory, cause the computing platform to:
receive, from a plurality of event processing systems, event processing identifiers corresponding to various events, wherein each event processing identifier identifies a corresponding event processing system of the plurality of event processing systems, wherein the computing platform and the plurality of event processing systems are configured in a first configuration;
generate, by the computing platform and using the event processing identifiers corresponding to the various events, event linkage information corresponding to the various events;
store, by the computing platform, the event processing identifiers corresponding to the various events along with the event linkage information for each of the corresponding various events;
receive, by the computing platform and from an administrator computing device, a request to access event lifecycle information corresponding to a particular event of the various events;
identify, by the computing platform and using the event linkage information corresponding to the particular event, a subset of the plurality of event processing systems that performed actions associated with the particular event;
access, from each of the subset of the plurality of event processing systems and via an application programming interface (API) hosted by the computing platform, system-specific event lifecycle information corresponding to the particular event, wherein accessing the system-specific event lifecycle information corresponding to the particular event via the API avoids redundant storage of the system-specific event lifecycle information at the computing platform and the subset of the plurality of event processing systems without reconfiguring the first configuration;
generate, by the computing platform and using the system-specific event lifecycle information corresponding to the particular event, an event lifecycle interface and one or more commands directing the administrator computing device to display the event lifecycle interface;
send, by the computing platform and to the administrator computing device, the event lifecycle interface and the one or more commands directing the administrator computing device to display the event lifecycle interface; and
receive, by the administrator computing device and via the event lifecycle interface, user input requesting access to further information from the plurality of event processing systems, wherein the receipt of the user input causes the administrator computing device to access the further information from the plurality of event processing systems.

20. The one or more non-transitory computer-readable media of claim 19, wherein:
the plurality of event processing systems includes a first event processing system, a second event processing system, and a third event processing system,
the system-specific event lifecycle information corresponding to the particular event includes first event lifecycle information from the first event processing system, second event lifecycle information from the second event processing system, and third event lifecycle information from the third event processing system, and
the first event lifecycle information, the second event lifecycle information, and the third lifecycle information are unique from each other.

* * * * *